United States Patent
Khamene et al.

(10) Patent No.: US 8,139,831 B2
(45) Date of Patent: Mar. 20, 2012

(54) SYSTEM AND METHOD FOR UNSUPERVISED DETECTION AND GLEASON GRADING OF PROSTATE CANCER WHOLE MOUNTS USING NIR FLUORSCENCE

(75) Inventors: Ali Khamene, Princeton, NJ (US); Tina Ehtiati, Baltimore, MD (US); John V. Frangioni, Wayland, MA (US); Vida Kianzad, Newton, MA (US); Fred S. Azar, Princeton, NJ (US)

(73) Assignee: Siemens Aktiengesellschaft, München (DE)

( * ) Notice: Subject to any disclaimer, the term of this patent is extended or adjusted under 35 U.S.C. 154(b) by 683 days.

(21) Appl. No.: 12/326,135

(22) Filed: Dec. 2, 2008

(65) Prior Publication Data

US 2009/0161928 A1 Jun. 25, 2009

Related U.S. Application Data

(60) Provisional application No. 60/992,759, filed on Dec. 6, 2007.

(51) Int. Cl.
*G06K 9/00* (2006.01)

(52) U.S. Cl. .................................. 382/128; 382/133
(58) Field of Classification Search .................. 382/128, 382/133
See application file for complete search history.

(56) References Cited

U.S. PATENT DOCUMENTS

| | | | | |
|---|---|---|---|---|
| 5,168,066 A * | 12/1992 | Zahniser et al. | ............... | 436/63 |
| 5,859,891 A * | 1/1999 | Hibbard | ..................... | 378/62 |
| 6,031,930 A * | 2/2000 | Bacus et al. | ................ | 382/133 |
| 6,134,354 A * | 10/2000 | Lee et al. | ..................... | 382/270 |
| 6,418,236 B1 * | 7/2002 | Ellis et al. | ..................... | 382/128 |
| 6,577,754 B2 * | 6/2003 | Stone et al. | .................. | 382/133 |
| 6,690,817 B1 * | 2/2004 | Cabib et al. | ................... | 382/134 |
| 7,245,748 B2 * | 7/2007 | Degani et al. | ................ | 382/128 |
| 7,272,252 B2 * | 9/2007 | De La Torre-Bueno et al. | ........................... | 382/133 |
| 7,343,033 B2 * | 3/2008 | Bartels | ........................ | 382/133 |
| 7,359,548 B2 * | 4/2008 | Douglass et al. | ............. | 382/162 |
| 7,461,048 B2 * | 12/2008 | Teverovskiy et al. | ........... | 706/62 |
| 7,474,775 B2 * | 1/2009 | Abramoff et al. | ............. | 382/128 |
| 7,542,959 B2 * | 6/2009 | Barnhill et al. | ................ | 706/48 |
| 7,627,154 B2 * | 12/2009 | Luo et al. | ..................... | 382/128 |
| 7,657,070 B2 * | 2/2010 | Lefebvre | ....................... | 382/128 |
| 7,668,351 B1 * | 2/2010 | Soliz et al. | .................... | 382/128 |
| 7,684,596 B2 * | 3/2010 | Watson et al. | ................ | 382/128 |
| 7,711,174 B2 * | 5/2010 | Sammak et al. | .............. | 382/133 |
| 7,761,240 B2 * | 7/2010 | Saidi et al. | ..................... | 702/19 |
| 7,885,448 B2 * | 2/2011 | Bartels | ......................... | 382/133 |
| 7,920,736 B2 * | 4/2011 | Sammak et al. | .............. | 382/133 |
| 2002/0186875 A1 * | 12/2002 | Burmer et al. | ................ | 382/133 |
| 2002/0196964 A1 * | 12/2002 | Stone et al. | ................... | 382/128 |
| 2003/0223627 A1 * | 12/2003 | Yoshida et al. | ............... | 382/128 |
| 2004/0029213 A1 * | 2/2004 | Callahan et al. | ............. | 435/40.5 |
| 2005/0136493 A1 * | 6/2005 | Rubin et al. | ................... | 435/7.23 |
| 2005/0165290 A1 * | 7/2005 | Kotsianti et al. | .............. | 600/407 |
| 2006/0039593 A1 * | 2/2006 | Sammak et al. | .............. | 382/133 |

(Continued)

*Primary Examiner* — John Lee
(74) *Attorney, Agent, or Firm* — Donald B. Paschburg; F. Chau & Associates, LLC

(57) ABSTRACT

A method for unsupervised classification of histological images of prostatic tissue includes providing histological image data obtained from a slide simultaneously co-stained with NIR fluorescent and Hematoxylin-and-Eosin (H&E) stains, segmenting prostate gland units in the image data, forming feature vectors by computing discriminating attributes of the segmented gland units, and using the feature vectors to train a multi-class classifier, where the classifier classifies prostatic tissue into benign, prostatic intraepithelial neoplasia (PIN), and Gleason scale adenocarcinoma grades 1 to 5 categories.

12 Claims, 3 Drawing Sheets

U.S. PATENT DOCUMENTS

| | | | |
|---|---|---|---|
| 2006/0064248 A1* | 3/2006 | Saidi et al. | 702/19 |
| 2007/0019854 A1* | 1/2007 | Gholap et al. | 382/133 |
| 2007/0099219 A1* | 5/2007 | Teverovskiy et al. | 435/6 |
| 2007/0287164 A1* | 12/2007 | Huang et al. | 435/7.23 |
| 2008/0013816 A1* | 1/2008 | Rimm et al. | 382/133 |
| 2008/0170766 A1* | 7/2008 | Yfantis | 382/128 |
| 2008/0170767 A1* | 7/2008 | Yfantis | 382/128 |
| 2009/0003691 A1* | 1/2009 | Padfield et al. | 382/164 |
| 2009/0028403 A1* | 1/2009 | Bar-Aviv et al. | 382/128 |
| 2009/0161928 A1* | 6/2009 | Khamene et al. | 382/128 |

* cited by examiner

SYSTEM AND METHOD FOR UNSUPERVISED DETECTION AND GLEASON GRADING OF PROSTATE CANCER WHOLE MOUNTS USING NIR FLUORSCENCE

CROSS REFERENCE TO RELATED UNITED STATES APPLICATIONS

This application claims priority from "Unsupervised Detection and Gleason Grading of Prostate Cancer Whole Mounts using NIR Fluorescence", Provisional Application No. 60/992,759 of Azar, et al., filed Dec. 6, 2007, the contents of which are herein incorporated by reference in their entireties.

GOVERNMENT LICENSE RIGHTS

This invention was made in part with Government support under Grant No. #R01-CA-115296 awarded by the National Institute of Health to John V. Frangioni and Vida Kianzad. The Government has certain rights in this invention.

TECHNICAL FIELD

This disclosure is directed to the unsupervised classification of histological images of prostatic tissue using histological data obtained from near infrared (NIR) fluorescent co-staining of hematoxylin-and-eosin (H&E) images.

DISCUSSION OF THE RELATED ART

The current gold standard for the diagnosis of prostate cancer is a combination of biochemical evaluation of serum prostate specific antigen (PSA) levels and the histological analysis of prostate biopsy specimens. The predominant metric used by pathologists around the world for grading prostate cancer is the Gleason grading system, named after Donald F. Gleason. The Gleason grading system is based on the glandular architecture of the prostate tissue, and the nuclear atypia or cytoplasmic features are not evaluated. This grading system judges how effectively the cancer cells are able to structure themselves into gland units resembling normal prostate, varying from the most differentiated (least malignant) to the least differentiated (most malignant), where differentiation represents the degree of tumor resemblance to normal tissue. According to the Gleason grading system, the cancer cells are classified to five patterns of growth (grades) of decreasing differentiation, grade 1 to 5. The primary and secondary grades, i.e., the most prevalent and the second most prevalent patterns present in the tissue specimens, are added to obtain a Gleason score or sum which is used for prognosis. Normal prostate tissue includes gland units surrounded by fibro-muscular tissue called stroma. Each gland unit is composed of rows of epithelial cells located around a duct or "lumen". Malignant cells disrupt the regular arrangement of the gland units, with Gleason grade 2 and 3 having fewer organized circular glands as compared to benign tissue, and Gleason grades 4 and 5 having a large number of nuclei in disorganized, infiltrative sheets, a lumen that is almost completely occluded, and/or small or non-existent stroma regions between glands. The features used by the Gleason grading system are the shape and the structure of the glands. Glands with loose structures or glands with more variable shapes are diagnosed as cancer. But the identification and grading of prostatic tumors by pathologists still remains a confounding task since some benign and malignant glands have overlapping features. Studies have shown significant levels of inter-observer and intra-observer variability in the manual grading of prostate cancer, with the rates of under-grading the tissue patterns as high as 47%. Most of the variability and error in pathologists' Gleason grading is in discriminating between grades 3 and 4.

The analysis of histological data is time-consuming and labor-intensive, and therefore many researchers have been interested in automating this procedure. A variety of low-level features such as color, texture (Haralick, power spectrum, etc), wavelets, second order statistics, and morphometric attributes and a variety of classification algorithms such as Gaussian classifiers, neural networks, nearest neighborhoods, boosting, and support vector machines have been used to characterize, detect, and classify cancer in prostate histological data. Some studies attempt to discriminate between benign and malignant tissue, some attempt to discriminate between low and high Gleason grades of the malignant tissue, and some attempt to classify the exact grading of the malignant tissue. Classification into low-grade and high-grade is clinically an easier task compared to the exact grading of the malignant tissue. However, to date there is no single technique capable of grading the entire spectrum of prostate pathology, from pre-malignant prostatic intraepithelial neoplasia (PIN) to Gleason grade 5 adenocarcinoma or producing any score.

SUMMARY OF THE INVENTION

Exemplary embodiments of the invention as described herein generally include methods and systems for unsupervised classification of prostatic tissue to benign, prostatic intraepithelial neoplasia (PIN), and Gleason scale adenocarcinoma grade 1 to 5, using inherently co-registered hematoxylin-and-eosin (H&E) and near infrared (NIR) fluorescent co-stained data. An embodiment of the invention uses data obtained by simultaneous (same slide) NIR fluorescence immunostaining and hematoxylin/eosin (H&E) staining technology. The data, co-stained with an alpha-methylacyl-CoA racemase (AMACR) protein biomarker with a NIR fluorescent secondary antibody, when viewed under fluorescent light, highlights the entire spectrum of prostate pathology from PIN to Gleason grade 5 and consequently is used to produce a unique training set with no benign tissue present. By restricting the data space to the space of PIN and malignant tissue, a classification algorithm according to an embodiment of the invention can find features to discriminate between early grades (1 & 2) and higher grades. Furthermore, use of NIR fluorescent AMACR biomarkers improves the results of the segmentation and feature extraction stage compared to H&E alone, and therefore produces stronger features for classification. By extraction of a combination of morphological, architectural, and texture features from this unique data set, classifiers can be trained for grading the entire spectrum of prostate pathology, from PIN to Gleason grade 5 adenocarcinoma.

FIG. 1 illustrates the 3D quantification and visualization of prostate cancer. Using the inherently co-registered Hematoxylin-and-Eosin (H&E) and NIR fluorescent co-stained data, one can display and quantify PIN and prostate cancer for an entire whole mount from a man with prostate cancer. The figure is a volume rendering of a pre-operative MRI with simulated PIN 11, Gleason grade 3 adenocarcinoma 12 and Gleason grade 4 adenocarcinoma 13 quantified using NIR fluorescence technology.

According to an embodiment of the invention, a classification algorithm within a probabilistic Bayesian framework is used to grade the two most prominent patterns present in the data and subsequently to compute the Gleason score. A probabilistic solution allows a classification system to detect the presence of more than one pattern in the data by finding the two classes which have the highest and second highest posterior probabilities. The computed posterior probabilities can also be used as a measure for the strength of the diagnosis, and borderline prognosis can be identified.

According to an aspect of the invention, there is provided a method for unsupervised classification of histological images of prostatic tissue, the method including providing histological image data obtained from a slide simultaneously co-stained with NIR fluorescent and Hematoxylin-and-Eosin (H&E) stains, segmenting prostate gland units in the image data, forming feature vectors by computing discriminating attributes of the segmented gland units, and using the feature vectors to train a multi-class classifier, where the classifier is adapted to classify prostatic tissue into benign, prostatic intraepithelial neoplasia (PIN), and Gleason scale adenocarcinoma grades 1 to 5 categories.

According to a further aspect of the invention, the classifier is trained within a Bayesian framework.

According to a further aspect of the invention, the classifier is trained to detect a most prominent and a second most prominent pattern in the image data, and to compute a Gleason score as a sum of Gleason grades of the patterns.

According to a further aspect of the invention, the method includes using Bayesian posterior probabilities to determine a strength of a diagnosis, where a borderline prognosis between two categories is provided to a second phase classifier using a classification model whose parameters are tuned to the two categories of the borderline prognosis.

According to a further aspect of the invention, the classifier is trained using a multi-class support vector machine.

According to a further aspect of the invention, the classifier is trained using a multi-class boosting algorithm.

According to a further aspect of the invention, the slide is co-stained with an AMACR biomarker.

According to a further aspect of the invention, the discriminating attributes include boundary and region descriptors, structural descriptors, and texture descriptors.

According to another aspect of the invention, there is provided a program storage device readable by a computer, tangibly embodying a program of instructions executable by the computer to perform the method steps for unsupervised classification of histological images of prostatic tissue.

DETAILED DESCRIPTION OF EXEMPLARY EMBODIMENTS

Figure 1:
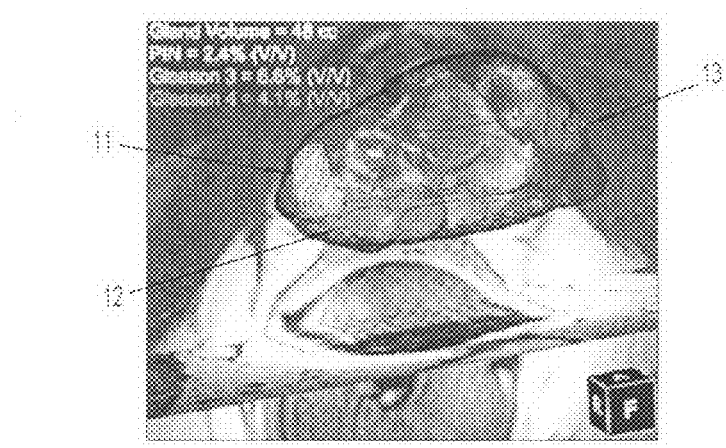
FIG. 1 is a volume rendering of a pre-operative MRI of prostate cancer, according to an embodiment of the invention.

Exemplary embodiments of the invention as described herein generally include systems and methods for unsupervised classification of histological images of prostatic tissue using histological data obtained from near infrared (NIR) fluorescent co-staining of hematoxylin-and-eosin (H&E) images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 3:
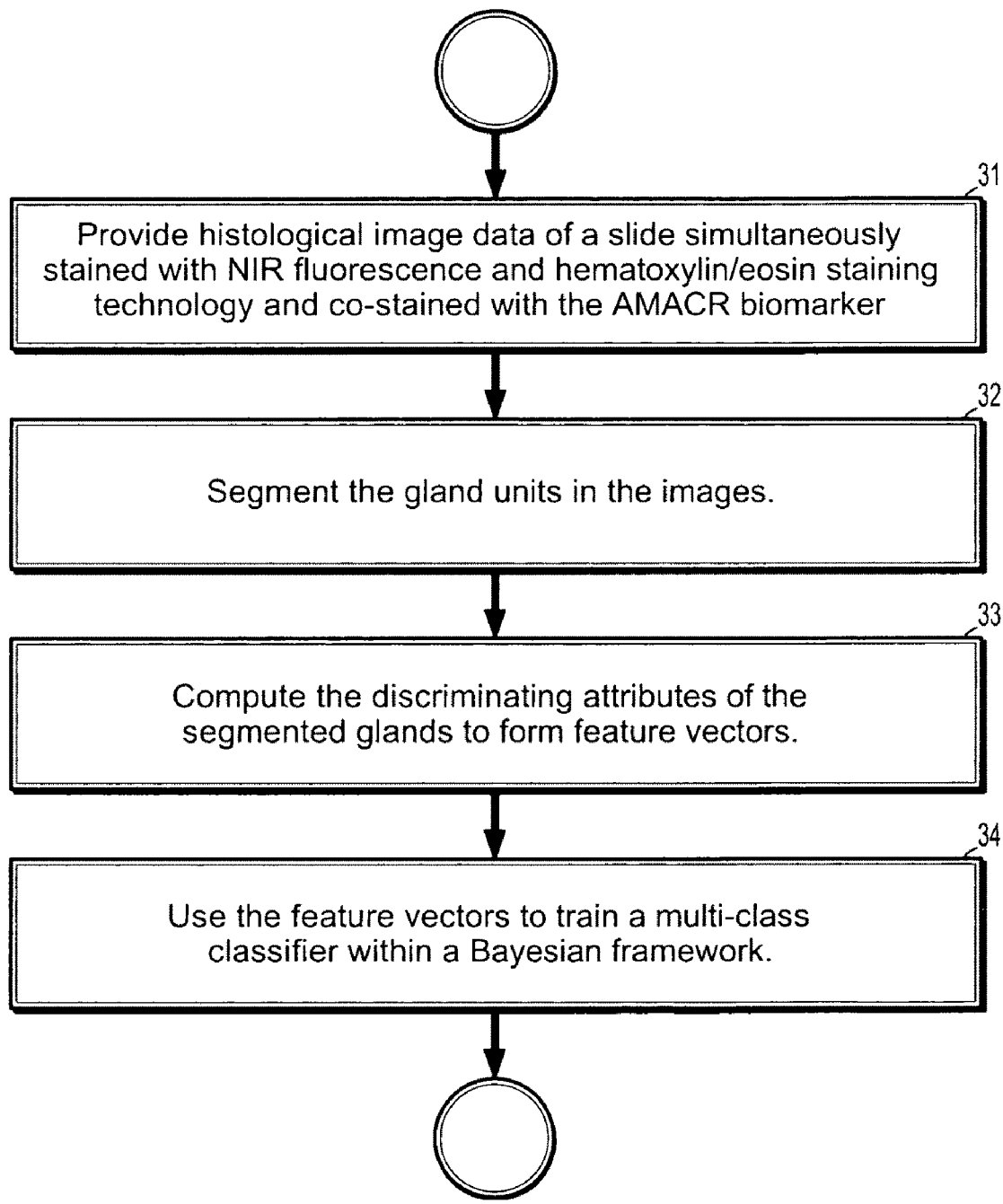
FIG. 3 is a flowchart of a method for unsupervised classification of histological images of prostatic tissue using histological data obtained from NIR fluorescent co-staining of hematoxylin-and-eosin (H&E) images, according to an embodiment of the invention.

A flowchart of a method according to an embodiment of the invention for unsupervised classification of histological images of prostatic tissue using histological data obtained from NIR fluorescent co-staining of hematoxylin-and-eosin (H&E) images is presented in FIG. 3. Referring now to the figure, a method begins at step 31 by providing digital histological image data of a slide simultaneously stained with NIR fluorescence immunostaining and hematoxylin/eosin (H&E) staining technology and co-stained with the AMACR biomarker. The simultaneous staining inherently co-registers the H&E and NIR fluorescent co-stained data. Feature extraction according to an embodiment of the invention can be performed in two steps. First, at step 32, the gland units are segmented in the images, and at step 33, the discriminating attributes of the segmented glands are computed to form feature vectors. The different types of features extracted are described in more detail below. Then, at step 34, a multi-class classifier is trained within a Bayesian framework using the feature vectors. These steps are described more fully below.

An embodiment of the invention uses 3D data sets of digitized histological data prepared and stained using simultaneous (same slide) NIR fluorescence immunostaining and hematoxylin/eosin (H&E) staining technology. Since the technique does not change the look of the H&E slide under visible light, the data set is first used and graded by pathologists based on the Gleason grading system to be used as ground truth for the training stage of a classification system of an embodiment of the invention. The same data set co-stained with an Alpha-methylacyl-CoA racemase (AMACR) protein biomarker with a NIR fluorescent secondary antibody when viewed under fluorescent light, highlights the entire spectrum of prostate pathology from PIN to Gleason grade 5, and consequently can be used to produce a unique training set with no benign tissue present. By restricting a data space to the space of PIN and malignant tissue, typically only 5-10% of prostate volume, a classification algorithm according to an embodiment of the invention can find optimal feature combinations to discriminate between early grades (grade 1 and 2) and intermediate grades (grades 3 and 4). The early grades (1 and 2) are hard to differentiate from the benign cases, and when early grade and benign cases are both present in a data set the task of classification among benign and the five Gleason grades becomes more challenging. By the use of AMACR and co-staining technology one can produce a data set free of benign cases and allow the classification algorithm of an embodiment of the invention to find features to classify early grades 1 and 2 and distinguish them from the intermediate and high grades.

Figure 2:
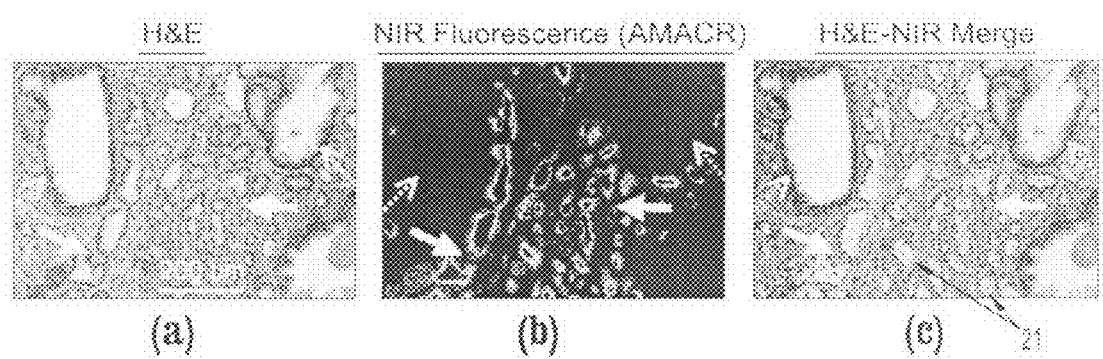
FIGS. 2(*a*)-(*c*) depicts the simultaneous H&E/NIR fluorescence staining of prostate cancer, according to an embodiment of the invention.

FIGS. 2(a)-(c) illustrate the simultaneous H&E/NIR fluorescence staining of prostate cancer. FIG. 2(a) depicts an H&E, FIG. 2(b) depicts an AMACR using an 800 nm NIR fluorescent secondary antibody, and FIG. 2(c) depicts a merge 21 of the two. For clarity, only two such merges are indicated. In each of the figures, a Gleason 6 (3+3) prostate cancer is labeled with thick solid arrows, and benign glands are labeled with thin dashed arrows.

The Gleason grading system uses the morphological and architectural attributes of the glands to distinguish the patterns belonging to each grade. Gleason grades 1 and 2 are defined by glands that have distinct shapes and arrangements, and as glands become less defined (more variable) in shape and arrangement, the Gleason grade increases. To capture the whole spectrum of attributes distinguishing the grades from each other, a combination of features is extracted: morphological (shape of glands), architectural (arrangements of glands), and texture (loss of shape and arrangement in glands).

According to an embodiment of the invention, a morphological watershed segmentation algorithm can be used for segmentation of the glands from the stained data set. Utilization of NIR fluorescent AMACR biomarker improves the results of the segmentation of gland units from the data compared to H&E alone and therefore produces stronger features for the classification stage. To illustrate this point the pseudo-colored H&E-NIR merge image of FIG. 2(c) is compared with the H&E only image of FIG. 2(a). Visually examining the two slides it can be seen that the H&E-NIR merge image provides better quality for segmentation of the gland units. After segmentation, the boundary and region descriptors are computed to quantify shape, size, topology, and regularity of the gland units, and structural descriptors are used to quantify the spatial relationship of the gland units.

According to an embodiment of the invention, the following features are proposed.

(1) Boundary and Region Descriptors: Using polygonal approximations, such as minimum perimeter polygons, as boundary descriptors of the segmented gland units, the shape and the size of the glands are quantified as the perimeter length, area, compactness (perimeter$^2$/area), eccentricity, curvature, Fourier shape descriptors of the approximated polygons. The topology of a gland unit is quantified using the number of connected components, number of holes, and the Euler number of the region circumscribed by the boundary of the gland unit. The first order statistics, e.g. mean, median, and standard deviation, of each measurement are computed over all the gland units in the sample image, i.e. the mean, median, and standard deviation of the perimeter length of all unit glands, to produce feature values which characterize the regularity of these measurements within the sample image.

(2) Structural Descriptors: Given the centers of the segmented gland units as a set of points in the image sample, Voronoi decomposition, Delaunay triangulation, and minimum spanning tree are computed to capture structural relationships among the gland units. The Voronoi decomposition tessellates the image into a set of polygons. The first order statistics of the perimeter and areas of these polygons are used as feature values characterizing the spatial relationships of the gland units. The first order statistics of the lengths of the edges produced by the Delaunay triangulation and the minimum spanning tree also produce feature values describing the spatial relationships of the gland units.

(3) Texture Descriptors: Haralick texture features are used to compute second order statistical features of the sample images. The Haralick features are based on co-occurrence matrices of size G×G where G is the number of gray levels in the images. Each entry in the co-occurrence matrix is the probability of occurrence of a grey level denoted by the row and the column index of the occurrence matrix in a specific spatial configuration. Second order statistical measures, including energy, angular momentum, entropy, contrast, correlation, and inverse difference momentum are computed from the normalized co-occurrence matrix. Wavelet texture features, computed using banks of Gabor filters, are also used to characterize structure at different scales and orientations. The Haralick features and the Gabor features are computed using sliding windows of different scales. Computing Haralick and Gabor features using a sliding window results in a matrix of the same size as the original feature image size. The dimensionality of the feature images is too high for classification purposes. Principal component analysis is used in order to reduce the dimensionality of the features. The decomposition coefficients obtained by projecting the feature images into their principal components are used as features for classification.

A classification system according to an embodiment of the invention addresses two aspects of the Gleason grading system. One aspect of the Gleason grading system is that it is not based on just the most prominent pattern present in the tissue sample. Most prostatic carcinoma have multiple histological patterns and a prognosis is intermediate between the most prominent pattern and the second most prominent pattern, if it comprises at least 5% of the tumor. The prognosis and the treatment are based on the Gleason score, which is the sum of the two most prominent Gleason grades. Another aspect of the Gleason grading system is that the attributes distinguishing the grades represent continuous qualities, where the strength of the attribute can create a strong or a borderline prognosis. The borderline cases represent a challenge in the Gleason grading system, and are sources of inter- and intra-observer variability.

A classification algorithm according to an embodiment of the invention uses a probabilistic Bayesian framework for discriminating among PIN and Gleason grades. A Bayesian solution produces posterior probability distributions for determining the probability of each class label given the test data. The computed probability values represent the strength of data belonging to each class. Using a Bayesian solution for classification, as opposed to reject/accept classification algorithms such as binary decision boosting and support vector machines used in previous works, the continuous quality of a pathologist's diagnosis can be reproduced. The computed posterior probabilities can be used to determine the strength of the diagnosis, and borderline prognosis can be identified. A borderline prognosis can then be fed back to the system to have a second phase classification, by using a classification model with parameters fine tuned to the two classes in the borderline case. The probabilistic solution also allows a classification system according to an embodiment of the invention to detect the presence of more than one pattern in the data, by finding the two classes which have the highest and second highest posterior probabilities.

According to an embodiment of the invention, the classification can be performed using two types of classifiers, a LogitBoost algorithm and a multi-class posterior probability support vector machine. Implementing classification using the Logitboost algorithm provides a means for efficient feature selection and provides an insight as to which features are more discriminating for the purpose of Gleason grading. This insight can be incorporated into a posterior probability support vector machine solution for fine-tuning of the system.

Classification algorithms according to embodiments of the invention can be implemented within a Bayesian framework, using the probabilistic interpretation of the classification algorithms. For each image $I_i$, $i=1, \ldots, N$, where N is the number of images in the training data set, an M dimensional feature vector $x_i$ is produced where $x_i = \{l_1, l_2, \ldots, l_M\}$, where each $l_m$ represents a feature measurement of image $I_i$, and M is the total number of features used. The classification label of $x_i$ is given by $y_i$ where $y_i = \{y_{i1}, y_{i2}, \ldots, y_{ij}\}$ where $y_{ij}$ take the values $\{-1, +1\}$ defining the classification response for a J class problem. The classification algorithms are trained and tested for J classes representing Gleason grades 1 to 5, and PIN.

For boosting according to an embodiment of the invention, a multi-class version of the LogitBoost algorithm was used. The LogitBoost algorithm provides a method to learn a set of response functions $F_j(x)$, $j=1, \ldots, J$, where each $F_j(x)$ is a linear combination of a number of weak classifiers, and J is the number of classes. The LogitBoost algorithm fits an additive symmetric logistic model to achieve maximum likelihood using adaptive quasi-Newton steps. A final classification result in LogitBoost algorithm is determined as $j = \arg\max F_j(x)$. A LogitBoost algorithm can approximate a posterior probability distribution by $$P(y_j = 1 \mid x) = \frac{\exp(F_j(x))}{\sum_{k=0}^{J} \exp(F_k(x))},$$

where $y_j$ is the classification response of class j to feature vector x. An embodiment of the invention uses this probabilistic interpretation of the LogitBoost algorithm and the probabilities of the J class labels given the input feature vector x to find the two class labels with the highest and the second highest probabilities. These two classes represent the two most prominent patterns present in the sample. In addition, the probability value can be used as a measure of the strength of the diagnosis.

A multiclass LogitBoost algorithm according to an embodiment of the invention for J classes starts with N input observations $x_i$, weights $w_{ij}=1/N$, $i=1, \ldots, N$, $j=1, \ldots, J$, $F_j(x)=0$, and $P_j(x)=1/J$, for all j. Then, the following steps are repeated for $m=1, \ldots, M$. (1): For $j=1, \ldots, J$, working responses and weights for the $j^{th}$ class are computed as $$z_{ij} = \frac{y_{ij}^* - p_{ij}}{p_{ij}(1 - p_{ij})}, \quad w_{ij} = p_{ij}(1 - p_{ij}),$$

where $y_{ij}$ is the $j^{th}$ label for the $i^{th}$ observation, and $p_{ij}$ is the probability that observation I has label j, and classification rule $f_{mj}(x)$ is estimated by a least squares fit of $z_{ij}$ to $x_i$. (2): The classification rule $f_{mj}(X)$ is updated as $$\frac{J-1}{J}\left(f_{mj}(x) - \frac{1}{J}\sum_{k=1}^{J} f_{mk}(x)\right),$$

and the sum rule $F_j(x)$ is updated by $F_j(x) + f_{mj}(x)$. (3): The overall probability $P_j(x)$ is updated using $$P_j(x) = \frac{\exp(F_j(x))}{\sum_{k=1}^{J} \exp(F_k(x))}, \quad \sum_{k=1}^{J} F_k(x) = 0.$$

Finally, the classifier is output as the $\arg\max_j F_j(x)$.

The original form of the support vector machine (SVM) algorithm solves a binary classification task where the input data x is labeled as $y = \{+1, -1\}$. The input vectors x are mapped onto vectors $\phi(x)$ in a high-dimensional space where the classification task would be linearly separable. In this space, a separating hyperplane $w \cdot \phi(x) + b = 0$ that has the largest margin (i.e. the largest minimal distance from all the data samples in the training set) is found by minimizing $$\frac{1}{2}\|w\|^2$$

subject to $y(w \cdot \phi(x) + b) \geq 1$, where w is the weight vector and b is the offset of the separating hyperplane. In cases where the task is not linearly separable, the slack parameters $\xi_x \geq 0$ are introduced and the optimization task is changed to minimizing $$\frac{1}{2}\|w\|^2 + C\sum_{i=1}^{N} \xi_{x_i}$$

subject to $y(w \cdot \phi(x) + b) \geq 1 - \xi_x$, where C, a positive real number, is the penalty coefficient.

A posterior probability support vector machines for multi-class problems according to an embodiment of the invention modifies the basic SVM to utilize class probabilities instead of using hard labels. These "soft labels" are calculated from estimated posterior probabilities as $$y_i = 2P(+|x_i) - 1,$$

subject to $$y_i(w \cdot x_i + b) \geq y_i^2(1 - \xi_i).$$

In this formulation, the difference between instances on the two sides of the hyperplane becomes $[2P(z_i|x_i)-1]-[2P(m|x_i)-1]$. Thus, the constraint of the binary formulation is replaced by the following constraint:

$$(w_{z_i} \cdot x_i) + b_{z_i} \geq (w_m \cdot x_i) + b_m + 2P(z_i|x_i) - 2P(m|x_i) - \xi_i^m.$$

The objective function in the dual formulation becomes $$\max 2\sum_{i=1}^{l}\sum_{m=1}^{k}\alpha_i^m[P(z_i\mid x_i)-P(m\mid x_i)]-$$

$$\frac{1}{2}\sum_{i=1}^{l}\sum_{j=1}^{l}C_j^{z_i}A_iA_j(x_i\cdot x_j)+\sum_{i=1}^{l}\sum_{j=1}^{l}\sum_{m=1}^{k}\left(\alpha_i^m\alpha_j^{z_i}-\frac{1}{2}\alpha_i^m\alpha_j^m\right)(x_i\cdot x_j)$$

The $(x_i\cdot x_j)$ term may be replaced by any suitable kernel function $K(x_i, x_j)$. Any density estimator can be used for estimating $P(j|x_i)$, $j=1,\ldots,k$.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
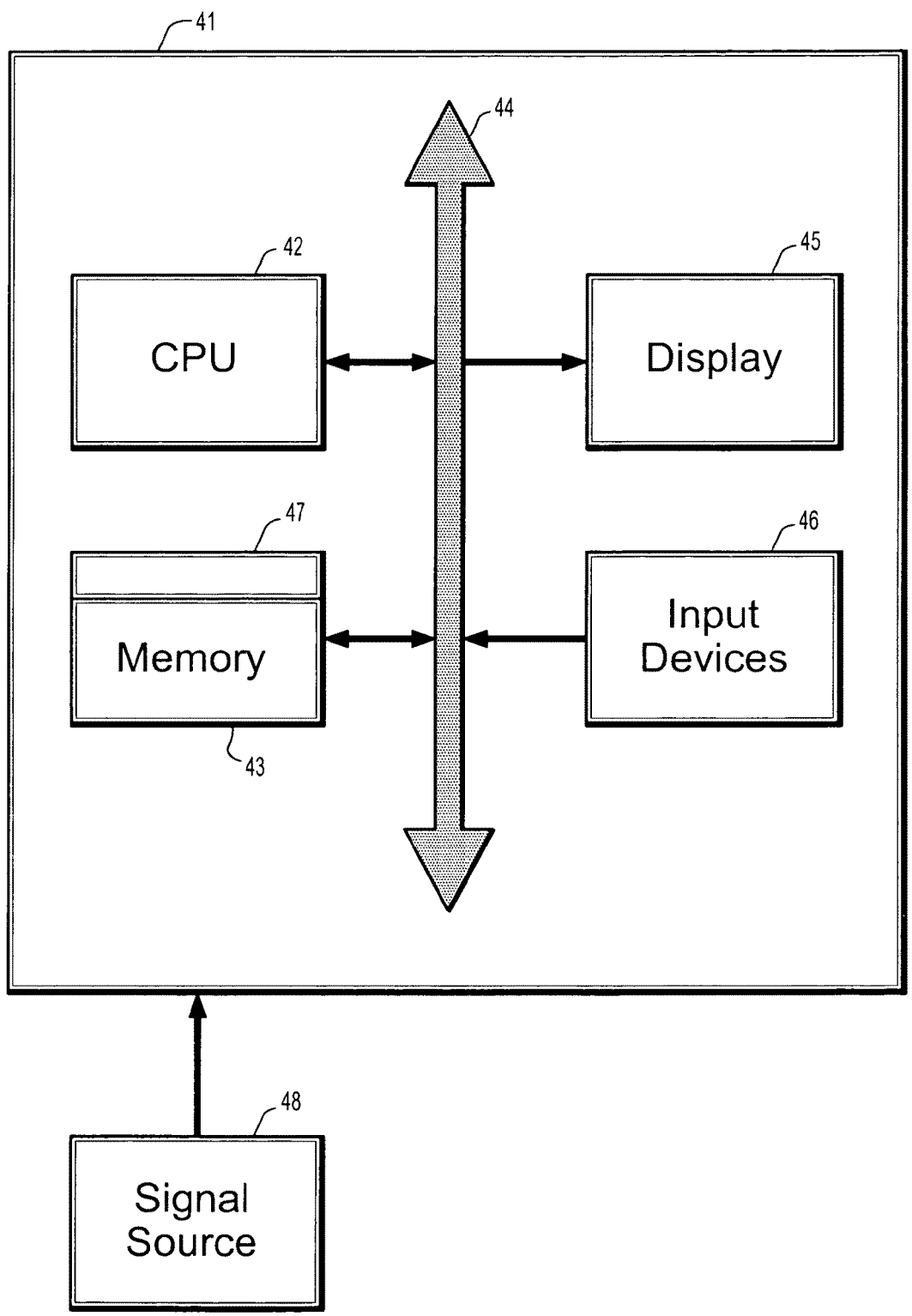
FIG. 4 is a block diagram of an exemplary computer system for implementing a method for unsupervised classification of histological images of prostatic tissue using histological data obtained from NIR fluorescent co-staining of hematoxylin-and-eosin (H&E) images, according to an embodiment of the invention.

FIG. 4 is a block diagram of an exemplary computer system for implementing a method for unsupervised classification of histological images of prostatic tissue using histological data obtained from NIR fluorescent co-staining of Hematoxylin-and-Eosin (H&E) images according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for unsupervised classification of histological images of prostatic tissue, comprising the steps of:
    providing histological image data obtained from a slide simultaneously co-stained with NIR fluorescent and Hematoxylin-and-Eosin (H&E) stains;
    segmenting prostate gland units in the image data;
    forming feature vectors by computing discriminating attributes of the segmented gland units; and
    using said feature vectors to train a multi-class classifier within a Bayesian framework, wherein said classifier is arranged to classify prostatic tissue into benign, prostatic intraepithelial neoplasia (PIN), and Gleason scale adenocarcinoma grades 1 to 5 categories and to use Bayesian posterior probabilities to determine a strength of a diagnosis, wherein a borderline prognosis between two categories is provided to a second phase classifier using a classification model whose parameters are tuned to the two categories of the borderline prognosis.

2. The method of claim 1, wherein said classifier is trained to detect a most prominent and a second most prominent pattern in said image data, and to compute a Gleason score as a sum of Gleason grades of said patterns.

3. The method of claim 1, wherein said classifier is trained using a multi-class support vector machine using a probabilistic interpretation of the classifier output.

4. The method of claim 1, wherein said classifier is trained using a multi-class boosting algorithm using a probabilistic interpretation of the classifier output.

5. The method of claim 1, wherein said slide is co-stained with an AMACR biomarker.

6. The method of claim 1, wherein said discriminating attributes include boundary and region descriptors, structural descriptors, and texture descriptors.

7. A program storage device readable by a computer, tangibly embodying a program of instructions executable by the computer to perform the method steps for unsupervised classification of histological images of prostatic tissue, said method comprising the steps of:
    providing histological image data obtained from a slide simultaneously co-stained with NIR fluorescent and Hematoxylin-and-Eosin (H&E) stains;
    segmenting prostate gland units in the image data;
    forming feature vectors by computing discriminating attributes of the segmented gland units; and
    using said feature vectors to train a multi-class classifier within a Bayesian framework, wherein said classifier is arranged to classify prostatic tissue into benign, prostatic intraepithelial neoplasia (PIN), and Gleason scale adenocarcinoma grades 1 to 5 categories and to use Bayesian posterior probabilities to determine a strength of a diagnosis, wherein a borderline prognosis between two categories is provided to a second phase classifier using a classification model whose parameters are tuned to the two categories of the borderline prognosis.

8. The computer readable program storage device of claim 7, wherein said classifier is trained to detect a most prominent and a second most prominent pattern in said image data, and to compute a Gleason score as a sum of Gleason grades of said patterns.

9. The computer readable program storage device of claim 7, wherein said classifier is trained using a multi-class support vector machine using a probabilistic interpretation of the classifier output.

10. The computer readable program storage device of claim 7, wherein said classifier is trained using a multi-class boosting algorithm using a probabilistic interpretation of the classifier output.

11. The computer readable program storage device of claim 7, wherein said slide is co-stained with an AMACR biomarker.

12. The computer readable program storage device of claim 7, wherein said discriminating attributes include boundary and region descriptors, structural descriptors, and texture descriptors.

* * * * *